United States Patent [19]

Porter

[11] Patent Number: 4,577,730

[45] Date of Patent: Mar. 25, 1986

[54] MECHANICAL LOCK

[75] Inventor: Clyde R. Porter, Los Angeles, Calif.

[73] Assignee: P. L. Porter Company, Woodland Hills, Calif.

[21] Appl. No.: 527,689

[22] Filed: Aug. 30, 1983

[51] Int. Cl.⁴ .............................................. B65H 59/10
[52] U.S. Cl. ...................................... 188/67; 297/375
[58] Field of Search ............... 188/67, 77 W; 74/531; 192/81 R, 81 C; 297/374, 375

[56] References Cited

U.S. PATENT DOCUMENTS

| | | | |
|---|---|---|---|
| 2,750,994 | 6/1956 | Howell | 188/67 |
| 3,249,180 | 5/1966 | Torossian | 188/67 |
| 3,874,480 | 4/1975 | Porter et al. | 188/67 |
| 4,411,339 | 10/1983 | Porter | 188/67 |
| 4,425,987 | 1/1984 | Porter | 188/67 |
| 4,457,406 | 7/1934 | Porter | 188/67 |

Primary Examiner—Duane A. Reger
Assistant Examiner—Alvin Oberley
Attorney, Agent, or Firm—Beehler, Pavitt, Siegemund, Jagger & Martella

[57] ABSTRACT

An infinitely positionable mechanical lock having a housing and at least one bushing fixed to the housing, the bushing having an inclined spring abutment surface. A rod is axially slidable through the bushing relative to the housing. A coil spring is wound about the rod, the spring having a normal inner diameter smaller than the diameter of the rod such that the coil spring grips the rod against translational motion within the housing. The spring is prebiased against the inclined surface of the bushing into normal locking engagement with the rod absent an axial load on the rod relative to the housing. A release assembly is actuatable for partly unwinding the coil spring to thereby release the rod for movement relative to the housing.

22 Claims, 6 Drawing Figures

U.S. Patent  Mar. 25, 1986  Sheet 1 of 3  4,577,730
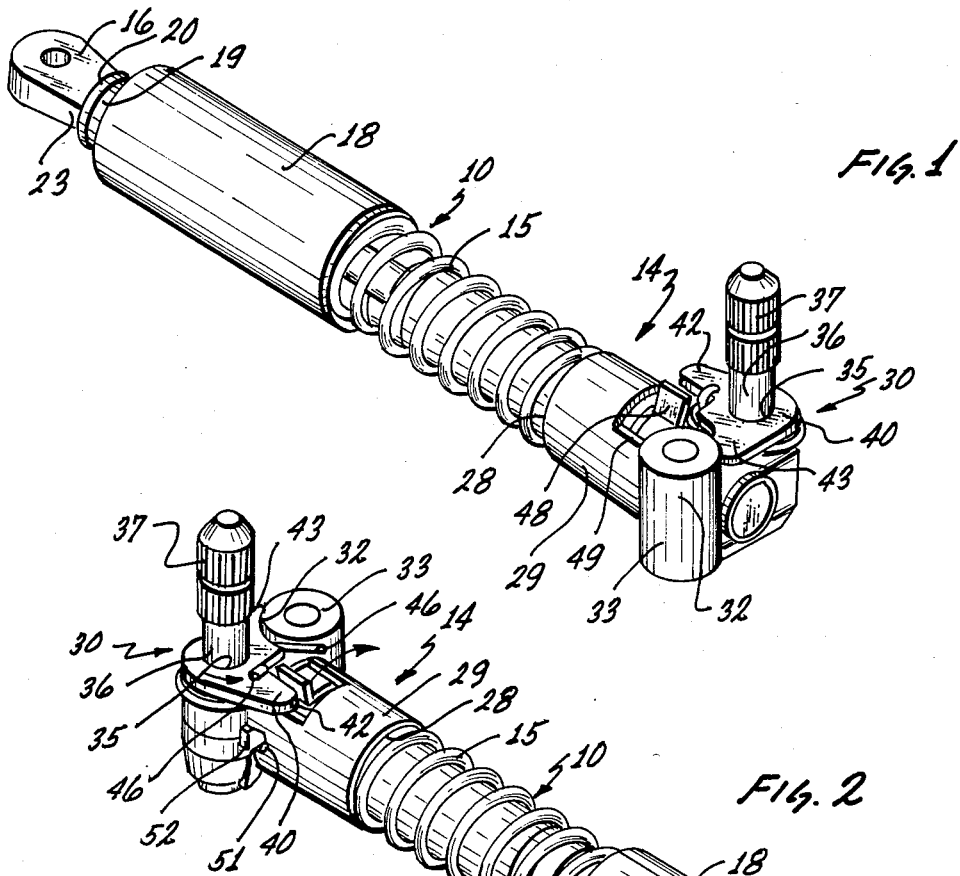
FIG. 1
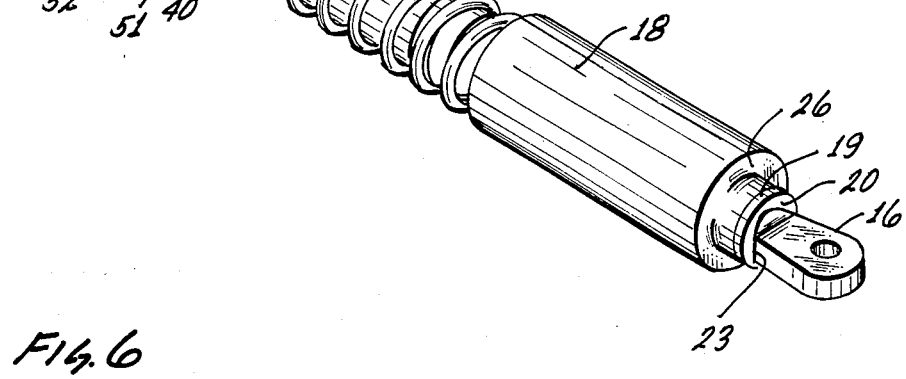
FIG. 2
FIG. 6
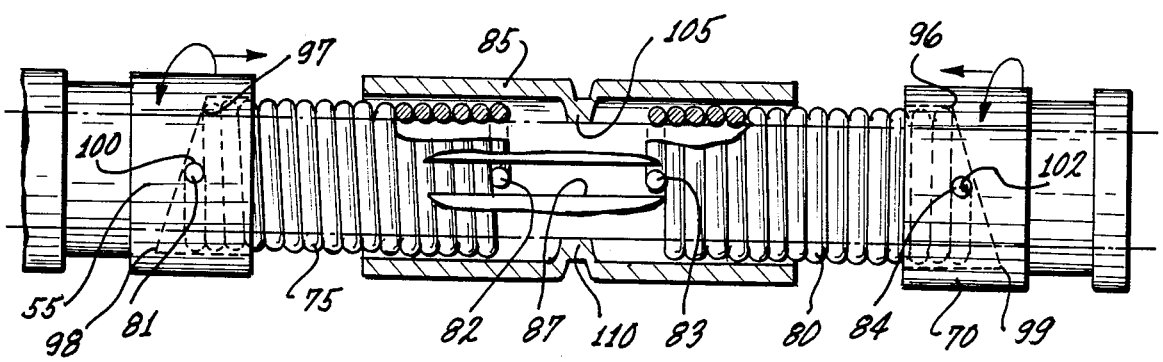

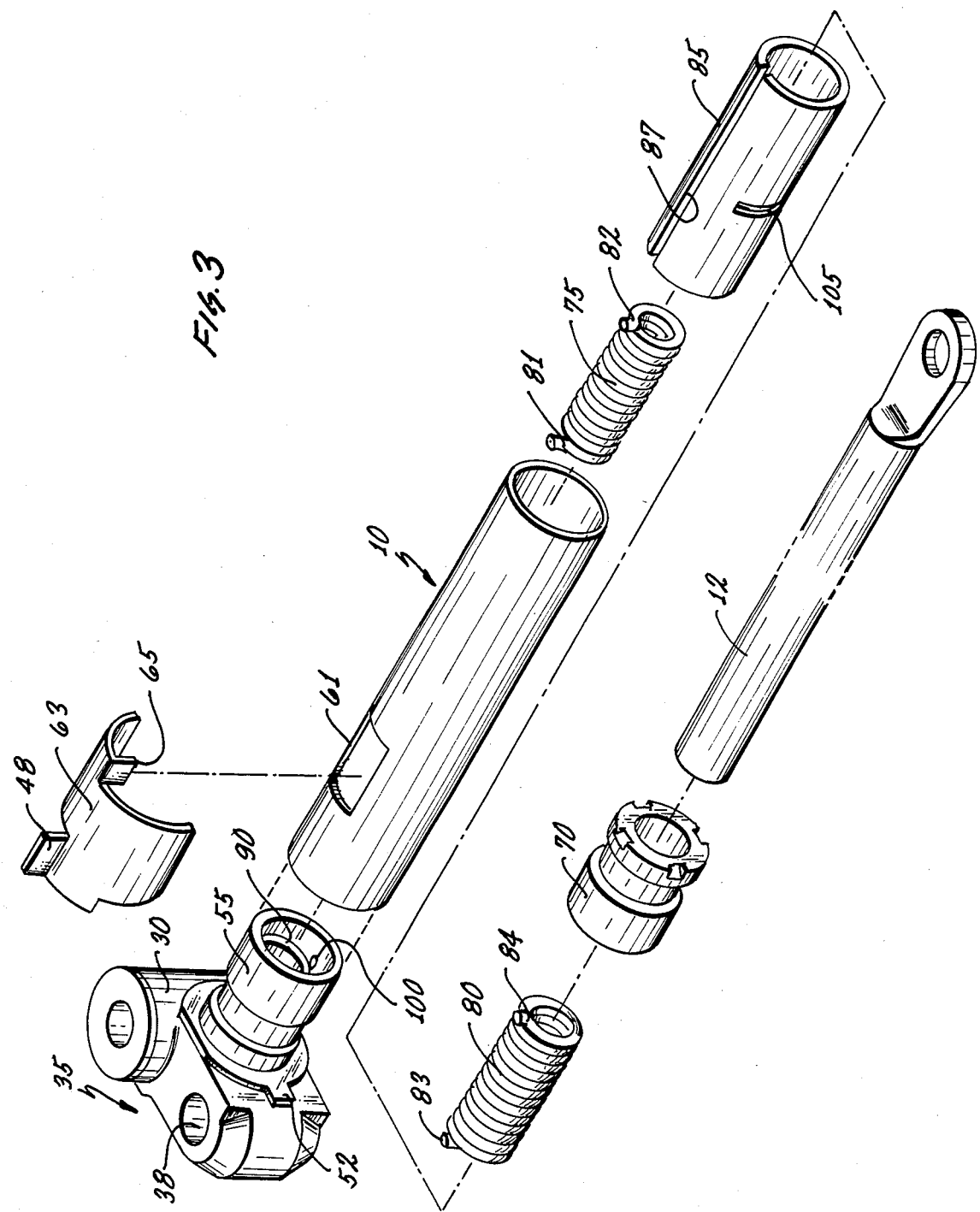

MECHANICAL LOCK

FIELD OF THE INVENTION

The present invention relates to mechanical locking devices and specifically to an infinitely positionable locking device of the type in which the locking is effected by coiled springs which grip a rod, for clamping the rod against translational motion relative to a housing and for selectively enabling such motion.

THE PRIOR ART

Friction brake locking devices are known in which a rod extends into a cylindrical housing. Normally, the rod is locked with respect to the housing so that axial translational motion of the rod relative to the housing is prevented. However, the device can be selectively actuated to an unlocked state in which such motion is enabled. One, and perhaps two, coiled springs are positioned within a housing and arranged coaxially with the rod in the locked state. The springs grip the curved surface of the rod to prevent the rod from moving with respect to the housing. An actuation lever permits an operator to partially unwind the springs, thereby increasing the inside diameter thereof so that the springs no longer grip the rod, which may then be moved freely axially within the coiled springs.

The use of one or more coiled springs to grip a rod extending coaxially though the spring is well known. A number of locking devices making use of this basic principle are known in the art.

Among the prior art devices is the locking device of U.S. Pat. No. 3,249,180 issued May 3, 1977 to Torossian. As shown in FIG. 10 of the Torossian patent, one spring is used and affixed at one end ot a fixed ring 109, while the other end of the spring 108 is engaged by a rotatable ring 110. The ring 110 engages a longitudinally-extending groove in the rod, so that when the rod is rotated, the ring also rotates to tighten the grip of the spring on the rod.

The device of the Torossian patent includes an abutment on the rotating ring and on the fixed ring to cause the spring to become cocked on the rod, in which state the gripping force of the spring on the rod increases with the axial load, thereby resulting in a true locking action. This aspect of the mechanics of the device was also recognized by Howell in U.S. Pat. No. 2,750,994 issued June 19, 1965, which also uses a single spring. However, as shown most clearly in FIG. 5 of the Howell patent, only the fixed sleeve 25 is provided with a beveled base 40, and the device is actuated by rotating the opposite end 31 of the spring. Accordingly, in Howell's device, it is necessary to unwind the many turns of the spring to transmit the enlargement of the diameter to the fixed end of the spring. This necessitates an unnecessarily long stroke for the actuating lever.

An improvement of the devices described in Torrosian and Howell patents is described in each of U.S. patent applications Ser. No. 157,458, now abandoned and Ser. No. 267,852, now U.S. Pat. No. 4,457,406 filed, respectively, on June 6, 1980 and May 28, 1981, assigned to the assignee of the present invention.

Another type of the prior art device using two springs is that shown in U.S. Pat. No. 3,874,480 issued Apr. 1, 1975 to Porter, et al, and likewise is an improvement over the prior patents referred to. As can best be seen in FIG. 2 of the Porter, et al patent, two springs are disposed co-axially to extend in opposite directions from a central actuating lever to fixed locking bushings located at opposite ends of a housing sleeve. One of the locking bushings locks the device in tension and the other locks it in compression. The interaction of the last two or three coils at the ends of the springs distal to the actuating lever with the locking bushings is responsible for the locking effect.

While only one of the springs in the Porter, et al device is effective at a particular instant to oppose tension or compression, unlocking of the device involves unwinding both springs simultaneously by use of the actuating lever. The lever must be moved through a sufficient stroke that the entire length of each spring is unwound, to ensure that the last two or three turns will be unwound. This necessitates a large actuating lever stroke which is opposed by the combined forces of both springs resisting unwinding. While such structure functions well, there are installations where, due to superior control design to actuate, there is a need for a friction brake type of device in which the stroke of the actuating lever is comparatively small and which operates at a comparatively smaller force.

In addition to the above, the following patents can be distinguished from the present invention on the basis that they do not include an abutment or beveled bushing against which the spring bears, and accordingly the true locking action discussed above is not employed. These patents include U.S. Pat. No. 2,434,480 to Anderson, issued Jan. 13, 1948; U.S. Pat. No. 3,320,595 to Kedem; U.S. Pat. No. 2,429,383 to Arens, and U.S. Pat. No. 3,064,766 to Hanizeski.

While the device of the Porter et al patent and that of the above identified applications function well, the performance of these devices can be improved significantly.

For example, recently it has been observed, due to more rigorous requirements in the automative industry for locks used in the control of seat backs, the so-called reclining seat that "walking" and "snap noise" occur in existing locks. Walking was observed as a movement in the direction of the applied load in small increments when repeated load reversals occur in the seat back, as may be encountered in travel over rough roads. The load reversals, compression to tension and vice-versa, are essentially to-and-fro oscillations of the seat back, with the result that the seat back changes its position gradually from the initially set position.

Various locks known to the art incorporate inclined spring abutment surfaces as in the referenced U.S. Pat. No. 3,874,480 to this applicant. The object of these inclined surfaces is to bias one or more coils turns of the spring at the end adjacent to the inclined surfaces when the end of the spring is urged against the abutment surface by a load acting on the rod relative to the housing. In a normal nonloaded condition of the lock, the coils of the spring are not biased relative to the rod but merely grip the rod by virtue of having a normal diameter which is lesser than that of the rod. Truly effective locking action of the springs occurs when at least some of the coils of the spring are biased, i.e. forced into an inclined relationship relative to the long axis of the coil spring. In a biased condition, each coil is deformed from a substantially circular shape to an elliptical shape, causing the biased coils to grip the rod more firmly as a result.

The use of inclined abutment surfaces at one or both ends of a coil spring in a mechnaical lock is an expedient well-known in the art as exemplified by U.S. Pat. No. 3,876,680 to Porter. In such locks, and specifically in the lock described in the aforementioned patent to this applicant, under certain circumstances such as automotive travel over rough terrain, the phenomena of "walking" and snap noise were observed in this type of mechanical lock. It is believed that both of these are due to the fact that when the load on the rod is reduced or momentarily removed by rapid load reversals caused by vibrations on the seat back, the biased coils of the lock spring release their grip on the rod allowing a slight displacement of the rod relative to the housing as the biased coils snap back to their normal unbiased condition with each cycle of the oscillation. Thus, effective locking action is dependent on a continuous load being applied to the rod relative to the housing. Each time the load is removed, the biased coils of the locking spring revert to an unbiased position in which the locking action is substantially weakened. Further, with every load reversal, a minute movement of the rod takes place as the coils move from their biased to their unbiased positions. This is believed to be the cause of the "walking" phenomenon noticed in this type of lock. In addition, when the lock is released by operation of its release mechanism while the coils of the spring are in a loaded, biased condition, the diameter of the coils is slightly enlarged by operation of the release mechanism as is known in the art, thus suddenly allowing the biased coils to snap back to their unbiased position, creating an annoying snapping or cracking noise which sounds as though something had broken in the lock.

In the present invention, "walking" and snap noise are substantially eliminated by pre-biasing the coils of the locking spring against the rod even in the absence of any load on the lock mechanism.

It will be appreciated that while the embodiment as described illustrated below by way of example only is a dual spring lock, a single spring lock can be constructed without departing from the principles disclosed herein. For example, a single spring lock could be constructed by simply bisecting the dual spring lock mechanism described below along a plane perpendicular to the rod and cutting across the shoulders located between the springs.

Further there are instances in which it is desirable to have a mechanical locking device in which the force needed to release the lock mechanism is reduced while also reducing the amount of movement of the actuating lever to effect release. A typical such application is in the automotive seat field in which movement of the seat back between an upright and reclining position should be accomplished smoothly and without a snap type action. Further, where the locking mechanism is of the direct control actuation type, i.e. the user manipulates a release lever, in contrast to some type of linkage mechanism of the remote control type, large forces for release or large movements of the actuating lever should be avoided.

While the above may be accomplished, one of the practical considerations is to accomplish these objectives with a relatively inexpensive device which is capable of functioning reliably over an extended period of time. Further, the device should be essentially maintenance free and capable of functioning over extreme temperature ranges and not adversely affected by water, dirt, dust and the like.

SUMMARY OF THE INVENTION

In accordance with the present invention, an improved infinitely positionable locking device is provided which overcomes the problems of walking and snap noise while offering the advantage of an essentially backlash free device and which has the further advantage of providing an adjustment mechanism which offers the solid feel of a quality seat assembly. In addition, the device of this invention may be packaged in a cartridge design which may be easily inserted into a housing thus eliminating the lever which was heretofore required to be inserted into an operating window for the device. Instead, the present device may be used with a relatively simple handle which may extend through the side of the seat.

Thus, in a presently preferred embodiment of the invention the lock mechanism includes a housing, a pair of bushings fixed axially and rotationally to the housing, and a rod axially slidable through the bushings relative to the housing. Each of the bushings has an inclined spring abutment surface. A pair of locking coil springs are axially spaced apart along the rod between the two bushings. The coil springs have a normal inner diameter somewhat smaller than the inner diameter of the rod such that when the springs are mounted to the rod the springs grip the rod against translational motion within the housing. Some or all of the coils of the locking springs are pre-biased into locking engagement against the rod even in the absence of any load on the lock. The pre-biasing means may comprise two separate means which are capable of operating independently on the opposite ends of each locking spring. Each of the locking springs terminates at both ends in radially extending tangs. The tang adjacent to the spring abutment surface (the outer tang) is captive in a radial bore formed in each of the bushings and located such that the end coils of the springs are urged against the inclined abutment surface thus forcing one or more of the end coils of each spring into a bias against the rod independently of any load on the locking device. The opposite or inner tang of each locking spring, is captive within an axial slot so as to prevent unwinding of the spring but allowing axial movement of the inner tang relative to the rod. Fixed shoulder means are provided between the two springs and are dimensioned such that when the lock is assembled, the locking springs are urged against the inclined abutment surfaces in an uneven fashion, the dimensions of the shoulders cooperating with the inclination of the abutment surfaces to bias the coils at the inner end of the springs into locking engagement with the rod. It will be thus appreciated that both ends of each of the locking springs are normally biased into locking engagement with the rod absent any load on the rod relative to the housing. As a result of the bias applied to both ends of the springs, the intermediate coils of each spring will also generally conform to the biasing forces applied to each end of the springs.

One of the two coil springs operates to lock the rod against compressional forces while the other functions to lock the rod against tensional forces. Unlocking is accomplished by a relatively simple mechanism which uncoils each of the springs to permit the rod to move axially of the housing.

The inclined spring abutment surfaces have a load side which is that portion of the inclined face nearest to the sleeve which surrounds the springs, and a bias side which is that portion of the inclined face distal from the said sleeve. Thus, the springs may also be described as having a load side, i.e., the side of the springs which lies between the load sides of the two end bushings, and a bias side which is diametrically opposed to the load side of the spring and extends between the bias sides of the bushings.

As presently understood, walking and snap noise are significantly reduced or eliminated while backlash is reduced or eliminated by the novel expedient of assuring that each of the coils springs is effective such that all, or essentially all of the coils between the ends thereof are in a locking condition with respect to the rod except when in a release condition. This is achieved in accordance with the present invention by assuring that the coils of the springs are canted in the locked position along their length, and maintained in that relation even though there may be load reversals. To this end, a sleeve is used which receives the radially extending tangs of the inner adjacent ends of the two springs, the sleeve including means in the form of integrally formed shoulders which bias the inner end coils of each of the springs away from each other. In the form described, the shoulders are dimensioned such that the bias side of the adjacent springs are displaced towards the bias side of the inclined bushing faces while the load side of the adjacent springs are spaced a lesser distance axially of the rod and are urged against the load receiving portion of the inclined spring abutment surface, so that no axial movement of the load side of the coil spring can take place. Further, each inclined bushing face includes an aperture which may be tangentially disposed to the inclined face but which extends radially of the bushing and which receives the radially extending outer end tang of the corresponding spring such that the tang is held against axial movement. The radial tang receiving aperture is is arranged axially intermediate the load side and the bias side of the inclined face so as to load the outer coil or coils of the spring against the load side of the bushing face. Preferably the tang receiving hole is arranged 270 degrees from the load receiving portion of the inclined spring abutment surface. In this way, each of the springs is held in a canted or biased position such that during load reversals, the springs do not roll, snap or permit backlash. In effect, the spring is pre-locked by virtue of the bias imparted to the spring coils through the cooperation of the location of the apertures of the bushings which receive one tang of each spring and the shoulders in the sleeve which control the other end of the spring to assure that the coils of the respective springs lockingly engage the rod except when uncoiled by the sleeve, as will be described.

The novel features which are believed to be characteristic of the invention, both as to organization and method of operation, together with further advantages thereof, will be better understood from the following description considered in connection with the accompanying drawings in which preferred forms of this invention are illustrated, by way of example. It is to be understood, however, that the drawings are for the purposes of illustration and description only and are not intended as a definition of the limits of the invention.

BRIEF DESCRIPTION OF THE DRAWINGS

FIG. 1 is a perspective view of a locking device in accordance with the present invention;

FIG. 2 is a perspective view of the locking device of the present invention as seen from the other side of FIG. 1;

FIG. 3 is a developed and exploded view, in perspective, of the component parts of the device of this invention in the unassembled condition, absent the outer spring and cover elements and the operator details;

FIG. 6 is a view, partly in section and partly in elevation, of the component parts of the invention during the assembly thereof.

DETAILED DESCRIPTION OF THE INVENTION

Figure 4:
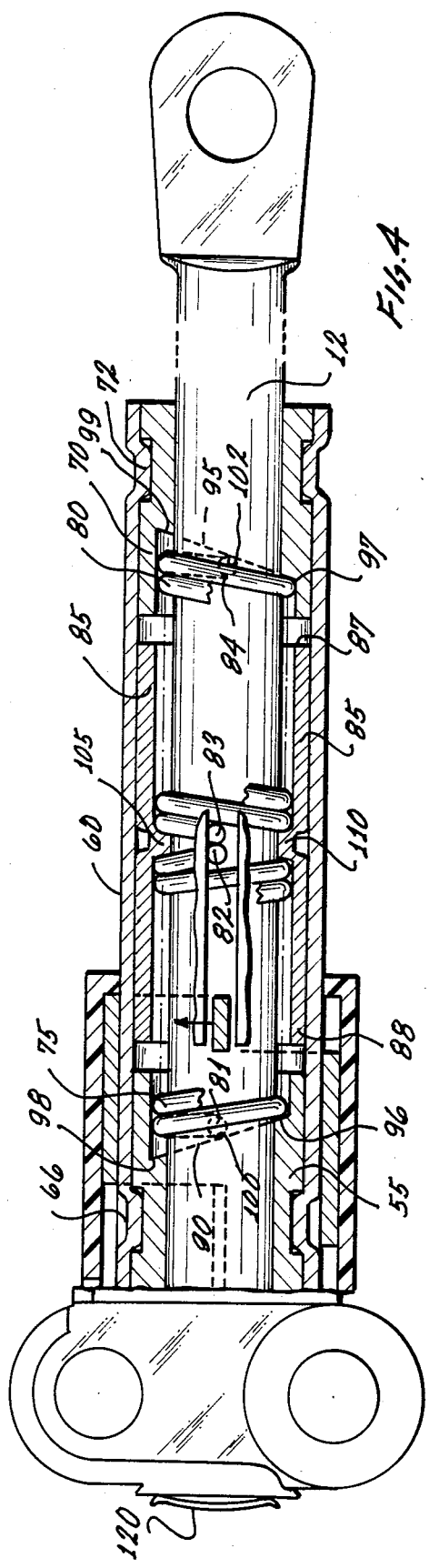
FIG. 4 is a view in section and partly in elevation of the device illustrated in FIG. 3 but in the assembled condition.

Referring to the drawings, which illustrate a preferred form of the present invention, FIGS. 1-3 show the mechanical and infinitely positionable locking device 10 of the present invention. By infinitely positionable is meant that there are no detents which control the relative position of the parts, and essentially any position of the relatively axially movable elements may be selected, as will be described, within the range of movement which may vary substantially in accordance with the needs of the user.

The device 10 includes a rod 12 which is movable axially with respect to the housing assembly indicated generally as 14. In the views of FIGS. 1 and 2, the device 10 is in the fully extended position which, in the case of a reclining seat, may represent one final position of the movable element with respect to the fixed element. For example, in this relative position of the parts, the seat back may be in the vertical position, although for other installations or other types of devices, it may represent other relative positions of the movable and fixed parts.

As illustrated in FIGS. 1 and 2, the rod 12 and an end portion of the housing 14 cooperate with a member 15, which in the form shown may be a spring, which biases the rod to one position of its movement, in this case, to the fully extended position of the rod relative to the housing. The rod includes a trunnion 16 on one end thereof for attachment to the device with which it is to operate, for example, a component of a reclinable seat, while the portion of the spring adjacent the trunnion is surrounded by a cap 18, which in the form shown may be a cylindrical element with a reduced necked portion 19 which bears against spacer 20 which abuts the enlarged inner end 23 of the trunnion. A cap includes an end wall 26, perpendicular to the rod, which forms an abutting surface for that end of the spring adjacent to the trunnion. Since the overall length of the lock may be varied during use, depending upon the desired adjustment desired, the other end of the spring 15 may abut against the end face 28 of a cover element 29 located over one end of the housing 14.

As shown, the housing includes an operating end, genrally designated 30, which may house the operator adjustment and end mounting assembly 32. In the form shown, assembly 32 may include a mounting sub assembly 33, which may be affixed to a movable or fixed component. The assembly 33 may also include an operating unit 35 including a shaft 36 with a serrated end 37, as shown, and upon which may be mounted an operating device not illustrated. In the case of adjustable seats, for example, a seat adjustment handle may be attached to the serrated end 37 to effect rotation of the shaft. It will be appreciated that attachment directly to the shaft 36 has advantages since the shaft may extend through the lower front or side of the seat, easily accessible to the user and easily adjustable to position the seat back, as may be desired. The usual movement may be up or down with respect to the seat in order to adjust the seat back position. The shaft 36 is received in an aperture 38 (FIG. 3) in the operating unit 35, and affixed to rotate with the shaft is a contact arm 40 having a finger 42 which rotates with the shaft 36. As shown, the contact arm also includes an abutment member 43 which contacts the mounting assembly 33. Cooperating with the contact arm is a biasing member 46, in the form of a spring, having one end 46 contacting the finger 42, the other end 47 contacting the mounting. In this way, the finger is biased in the clockwise direction (FIG. 2) with member 43 acting as a stop. Upon rotation of the shaft 36, the contact arm rotates with the shaft in the direction indicated by the arrow in FIG. 2, and finger 42 contacts and moves an operating finger 48, to be described, and which extends through a window 49 in the cover element. The cover element 29 includes a notch 51 which fits over a shoulder 52 on the operating body to prevent rotation of the cover 29.

Referring now to FIG. 3, the operating end 30 may include a bushing 55 as an integral part or the latter may be a separate element mounted in a non-rotational manner to the body. Received over the bushing 55 and affixed thereto is an outer housing tube 60, having a window 61 which is aligned with window 49. The operating finger 48 is part of an operating lever assembly 63, arcuate in shape, and which includes lever 65 which extends through the window 61 into the interior of the tube 60.

Figure 5:
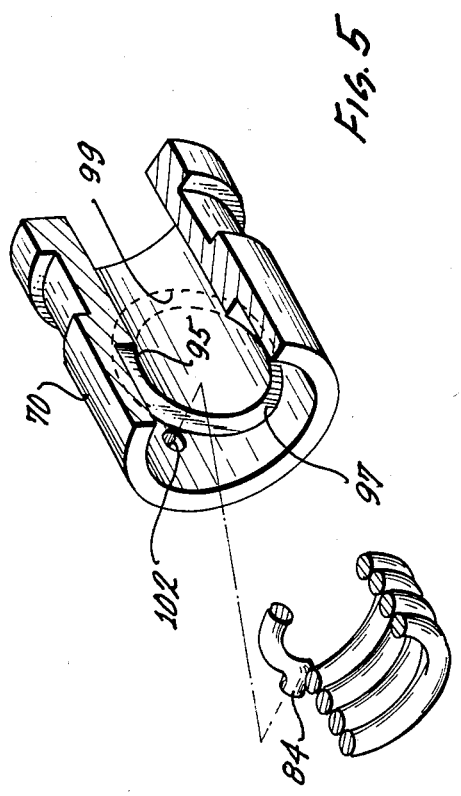
FIG. 5 is a fragmentary sectional view, partly in elevation, showing the end bushing and part of the coil spring as illustrated in FIG. 4, but in an enlarged form.

Referring to FIGS. 3 and 5, the outer housing tube 60 may be swaged to the bushing 55, as indicated at 66, while a second bushing 70 is swaged to the other end of the tube 60 as shown at 72. The operating end 30 and the tube 60 form a housing which is fixed relative to the rod 12 while the bushings 55 and 70 are mounted in the housing, as described.

Positioned over the rod 12 and located between the spaced bushings 55 and 70 are a pair of oppositely wound coil springs 75 and 80, the inner diameter of the springs and the outer diameter of the rod being such that the rod diameter is slightly larger than thee I.D. of the springs when the latter are not mounted on the rod. Each spring includes a radially extending tang 81, 82 and 83, 84 which in the relaxed state of the springs may extend in line, as shown in FIG. 3. Cooperating with the springs 75 and 80 is a sleeve 85 positioned between the tube and the springs in order to prevent the spring coils from moving radially with respect to the rod. As shown, the axial dimension of the sleeve is less than the combined axial length of the springs so that the ends 87 and 88 of the sleeve are spaced from the associated ends of the bushings, thus enabling the sleeve to rotate around the axis of the rod without interference from the bushings.

The sleeve 85 receives tangs 82 and 83 of the springs 75 and 80, and includes an aperture which may be in the form of a slot 89, as shown. Also received in the portion of the slot 87 adjacent the bushing 55 is the lever 65 which extends through the window 61, so that upon arcuate movement of the finger 48, the lever assembly 63 and lever 65 move arcuately effecting rotation of the sleeve 85 and rotation of the tangs 82 and 84. The other end of each of the springs is mounted in the associated bushing such that the one end of the spring is fixed in the bushing while the other end moves as the sleeve 85 is rotated.

Each bushing 55 and 70 includes an inner tapered spring abutment surface 90 and 95, respectiely, which is inclined with respect to the axis of the rod and each of which includes a first or load surface portion designated 96 and 97, respectively, and a second or bias surface portion 98 and 99, respectively, as shown. Each bushing also includes a radial aperture or bore 100 and 102, respectively, which receives a tang 81 and 82, respectively so as to hold the tangs against both axial and circumferential movement. The circular rims of the bores 100 and 102 are preferably located on a tangent with respect to the associated spring abutment surfaces 90 and 95.

As shown in FIG. 4, the sleeve 85 includes radially inwardly projecting shoulders 105 and 110 located 180 degrees from each other and 90 degrees from the slot 87. These shoulders form spring abutment surfaces such that load side of the inner end coil of each spring bears against the associated shoulder. As shown, shoulder 105, which is positioned arcuately in alignment with the load surface portions 98 and 99 of the bushings, has an axial width dimension smaller than the axial width dimension of shoulder 110. It will be noted that the inner tang of the springs is disposed 180 degrees relative to the outer tang in the bushings in each case. Moreover, the bushing apertures 100, 102 are positioned such that the arcuate distance between the first or load surface portion of each bushing and the corresponding tang, in the assembled lock measured along the last coil of each spring, is 270 degrees, as shown in FIG. 5.

Thus, referring to FIGS. 4 and 5, the structure described substantially eliminates "walking" and "snap noise" while reducing backlash. More specifically, in the prior devices only the end coils adjacent the bushing and the release mechanism provided locking. The combined effect of the tang receiving bores 100, 102 and the shoulder means 105, 110 is a locking bias in essentially all the coils of each spring along the length thereof. As illustrated in FIG. 4, the shoulders operate to bias the coils in opposite directions and at an angle approaching the angle of the inclined surfaces of the associated end bushing. As the sleeve 85 is rotated a small amount, the springs 75 and 80 are uncoiled to permit axial movement of the rod.

To understand the improved structure of this invention, one should understand that springs 75 and 80 are oppositely wound, one resisting movement of the rod in a compression condition and the other resisting movement of the rod in a tension condition. By the above described structure, a lock is provided which is infinitely adjustable and which locks both in tension and in compression.

In the assembled position of the springs 75 and 80 on the rod 12, the tangs of each spring which in the relaxed states were in line are now oriented such that they are 180° to each other as seen in FIG. 4. The diameter of the rod is larger than the inside diameter of the spring coils such that when assembled on the rod, each spring increases in diameter with the result that the tangs are now displaced 180° to each other. Thus, for example, as illustrated in FIG. 6, the tang 81 is inserted into the aperture 100 of bushing 55 while tang 82 is located in slot 87. Tang 84 is received in aperture 102 of bushing 70 while tang 83 is received in slot 87.

In the relative position of the parts shown in FIG. 6, it will be noted that the bias surface portions 98 and 99 are in line with each other and in line with the wider shoulder 110 while the load surface portions 96 and 97 are in line with narrower shoulder 105. As the springs are assembled over the rod 12 together with the corresponding bushing, they are expanded in diameter and the effect is to rotate each of the bushings 55 and 70 180° plus or minus 10° to each other to assure that surfaces 96 and 97 are aligned with shoulder 110.

By this arrangement, the portions of the springs between surfaces 96, 97 and shoulder 110 i.e. the "load side" of the springs, are axially aligned with each other and compressed against axial movement in a relatively stationary position since the bushings are fixed axially in position in the housing and bushing 70 has been urged towards bushing 55 before swaging 70 to the housing as shown at 72.

Since the axial distance between surface 98 and shoulder 105 and between surface 99 and shoulder 105 are each greater than the dimension of the corresponding load side of each spring, this region is referred to as the "bias" side and the coils are not restricted against axial movement on the bias side to the same extent as on the load side. Nonetheless, the coils of the springs on the bias side are restricted by the shoulder 105 against reverse biasing and urged into positive locking bias towards the corresponding inclined bushing face.

In addition, the end coils of the spring received in the bushings is in a pre-locked bias condition by arrangement of the apertures 100 and 102 tangent to the tapered surfaces 90 and 95. The aperture in each bushing is located 270° from the load point so that the end coils act as a lock and coils along the length of the spring are urged in locking bias condition. Such an arrangement reduces or eliminates reverse biasing of the coils which tends to cause walking. Also, with the end coils adjacent the bushing in a pre-locked condition and the center coils in a bias locked condition, back-lash is substantially reduced or eliminated, i.e., there is little, if any, free movement of the seat back under load reversals fore and aft.

As shown in FIG. 4, the end 120 of the rod 12 may be formed over to provide a stop limiting movement of the rod to the right as seen in FIG. 4.

In operation, the unit is normally in a locked position and release is accomplished by the relatively small rotation of the shaft 36 of the operator to cause the finger 42 to move the lever 48 in the direction shown by the arrow in FIG. 2. When released, spring 15 biases the lock so that the rod 12 is fully extended, normally positioning the seat back in a forward position. Release is accomplished by rotation of the sleeve 85 which rotates tangs 82, 83 to uncoil the springs along their length to permit axial movement of the rod 12 relative to the housing. In the release position, the seat back, for example, may be adjusted to any position as permitted by the installation of lock 10.

Thus, the novel lock of this invention is a significant improvement over prior art devices for the reasons described. It will also be realized by those skilled in the art that the present invention may be utilized in a wide variety of structures which, in some instances, may bear little or no physical resemblance to the illustrated embodiments. The lock, as will be understood, may be used with structures other than seats. Thus, the various modifications as may be made by those skilled in the art will not exceed the scope of the present invention so long as they are within the scope of the following claims.

I claim:

1. As an article of manufacture, an infinitely positionable mechanical lock comprising:
    a housing;
    a pair of bushings fixed to said housing;
    a rod axially slidable through said bushings relative to said housing;
    each bushing having an inclined spring abutment surface;
    a pair of coil springs axially spaced along said rod between said bushings, said coil springs having a normal inner diameter smaller than the diameter of said rod such that said coil springs grip said rod against translational motion within said housing;
    pre-biasing means for normally biasing at least one coil of each said spring in mutually opposite directions against said inclined spring abutment surfaces and into locking engagement with said rod absent an axial load on said rod relative to said housing; and
    release means actuatable for partly unwinding the biased ends of said coil springs to release said rod for movement through said housing.

2. The lock of claim 1 wherein each said coil spring has an axially inner end and an axially outer end and a radial tang at each said end,
    each of said inclined bearing surfaces having a load side contacting the last coil of a corresponding spring and a bias side diametrically opposite said load side,
    said prebiasing means comprising first tang engaging means spaced circumferentially from said load points for normally retaining the axially outer tang of each said coil spring axially intermediate said load side and said bias side so as to bias at least the last coil of each spring against the corresponding inclined bearing surface to thereby lock the rod to said housing.

3. The lock of claim 2 wherein said prebiasing means further comprise means intermediate said two coil springs for loading said springs against said inclined bearing surfaces to thereby bias at least one coil at the inner ends of said springs into locking engagement with said rod.

4. The lock of claim 2 wherein said radial end tangs of each spring lie along a straight line parallel to the coil spring axis when said springs are in a relaxed condition, and said tangs are circumferentially displaced by approximately 180° when the spring is mounted to said rod.

5. The lock of claim 2 wherein said first tang engaging means comprise radial holes defined in said bushings.

6. The lock of claim 5 wherein said radial holes are located 270° from the load point of said inclined bearing surfaces.

7. The lock of claim 5 wherein said radial holes have rims tangent to said inclined bearing surfaces.

8. The lock of claim 3 wherein said intermediate means comprise diametrically opposed first and second shoulder means interposed between said two springs, and
    second tang engaging means circumferentially intermediate said first and second shoulder means for normally retaining the inner radial tangs of both said springs circumferentially intermediate said first and second shoulders, one of said shoulders being dimensioned so as to urge one side of each spring against the load side of the corresponding inclined surface, the other of said shoulders loading the other side of each spring towards the bias side of the corresponding inclined surface, the two shoulders being dimensioned so as to bias the coils of the two springs against the rod.

9. The lock of claim 3 wherein said release means include control means for rotating said second tang engaging means about said rod.

10. The lock of claim 8 wherein said second tang engaging means comprises rotatable sleeve means about said springs, said sleeve means being apertured for receiving the axially inner tangs of said springs; and said release means comprise control means for effecting rotation of said sleeve to thereby unwind said springs.

11. The lock of claim 10 wherein said sleeve means closely surround said coil springs such that unwinding movement is readily transmitted along said springs.

12. The lock of claim 10 further comprising a window in said housing, and wherein said control means comprise lever means extending through said window into engagement with said sleeve means.

13. The lock of claim 12 said control means further comprising a shaft perpendicular to said rod and rotatably mounted at one end of said housing, and contact arm means rotatable with said shaft into engagement with said lever means to thereby effect rotation of said sleeve means.

14. The lock of claim 12 wherein said sleeve means aperture comprises an axially extending slot, said slot receiving said inner tangs and said lever means.

15. The lock of claim 1 wherein said coil springs are wound in mutually opposite directions.

16. The lock of claim 1 further comprising spring means urging said rod towards an extended position relative to said housing.

17. As an article of manufacture, an infinitely positionable mechanical lock having:
a housing;
a pair of bushings fixed to said housing;
a rod axially slidable through said bushings relative to said housing;
a pair of coil springs axially spaced along said rod between said bushings, said coil springs having a normal inner diameter smaller than the diameter of said rod such that said coil springs grip said rod against translational motion within said housing,
each said coil spring having an outer end and an inner end, each said end terminating in a radial tang;
each bushing having an inclined spring abutment surface;
each said inclined surface having a load side proximal to said springs and a bias side distal to said springs;
tang receiving means in said bushings located for normally loading the outer end of a corresponding coil spring against said load side of the spring abutment surface to thereby normally bias at least one coil of said spring into locking engagement with said rod;
a rotatable sleeve about said springs apertured for receiving the tangs at said inner ends of said springs, shoulder means on said sleeve for normally biasing the inner ends of both said coil springs into locking engagement with rod, and release means actuatable for simultaneously unwinding said coil springs to release said rod for movement through said housing.

18. As an article of manufacture, an infinitely positionable mechanical lock comprising:
a housing;
at least one bushing fixed to said housing, said bushing having an inclined spring abutment surface;
a rod axially slidable through said least one bushing relative to said housing;
a coil spring on said rod, said coil spring having a normal inner diameter smaller than the diameter of said rod such that said coil spring normally grips said rod against translational motion within said housing,
pre-biasing means for normally biasing at least one coil of said coil spring against said inclined spring abutment surface and into locking engagement with said rod absent an axial load on said rod relative to said housing; and
release means actuatable for partly unwinding said coil spring to release said rod for movement through said housing.

19. The lock of claim 18 wherein all coils of said coil spring are normally biased relative to said rod to thereby lock the rod against translation through said housing.

20. The lock of claim 18 wherein said coil spring has a first end proximal to said inclined surface and an opposite end, each said end terminating in a radial tang, said inclined spring abutment surface having a load side contacting the last coil on the proximal end of the spring and a bias side diametrically opposite said load side, said prebiasing means comprising tang receiving means for retaining the proximal tang of said spring axially intermediate said load side and said bias side of said inclined surface.

21. The lock of claim 20 wherein said prebiasing means further comprise means engaging said opposite side of the coiled spring and urging one side of the coiled spring against said load side of the inclined spring abutment surface, and biasing the diametrically opposite side of the spring towards said bias side of the inclined abutment surface to thereby normally bias all of the coils of said coil spring into locking engagement with said rod.

22. The lock of claim 21 wherein said release means comprise a rotatable sleeve about said coil spring, the tang at said opposite end being received in an opening defined in said sleeve, and control means for rotating said sleeve relative to said least one bushing to thereby unwind the coiled spring and release said rod.

* * * * *